(12) United States Patent
Smith

(10) Patent No.: US 6,213,285 B1
(45) Date of Patent: Apr. 10, 2001

(54) METHOD OF INDEXING CONVEYOR PALLETS AT HIGH SPEEDS

(75) Inventor: Darrick Taylor Smith, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/200,171

(22) Filed: Nov. 25, 1998

(51) Int. Cl.[7] .................................................. B65G 29/00
(52) U.S. Cl. ................................ 198/465.1; 198/345.3; 198/346.1
(58) Field of Search ..................... 198/345.3, 346.1, 198/465.1

(56) References Cited

U.S. PATENT DOCUMENTS

| | | |
|---|---|---|
| 3,805,942 | 4/1974 | Auernhammer . |
| 3,934,701 * | 1/1976 | Mooney et al. .................. 198/345.3 |
| 4,312,110 | 1/1982 | Averyanov et al. . |
| 4,552,260 * | 11/1985 | Teagno et al. ..................... 198/345.3 |
| 4,570,782 | 2/1986 | Cargill et al. . |
| 4,626,160 * | 12/1986 | Shiomi et al. ..................... 198/345.3 |
| 4,662,503 | 5/1987 | Lycke . |
| 4,713,883 | 12/1987 | Santandrea et al. . |
| 4,782,567 | 11/1988 | Kanaya et al. . |
| 4,991,706 | 2/1991 | Kitamura et al. . |
| 5,676,235 * | 10/1997 | Sam et al. .......................... 198/345.3 |
| 5,860,505 * | 1/1999 | Metzger ............................. 198/345.3 |
| 5,893,447 * | 4/1999 | Brintazzoli ........................ 198/345.3 |
| 5,966,798 * | 10/1999 | Ohnishi et al. .................... 198/345.3 |

* cited by examiner

Primary Examiner—Douglas Hess
(74) Attorney, Agent, or Firm—Douglas R. Millett; Felsman, Bradley, Vade, Gunter & Dillon, LLP

(57) ABSTRACT

A pallet accelerator transfers workpiece pallets at high speeds from a pre-stop to a work stop in a conveyorized manufacturing line. While a workpiece is being processed in the work stop position, a pallet is released from a release stop into the pallet accelerator at the pre-stop position. The pallet accelerator has two fingers which engage the pallet. The pallet accelerator is pneumatically actuated to accelerate the pre-stop pallet forward while simultaneously pushing the work stop pallet downstream out of the work stop. The pallet accelerator resets for the next pallet released from the release stop while the pallet at the work stop is processed.

34 Claims, 3 Drawing Sheets

METHOD OF INDEXING CONVEYOR PALLETS AT HIGH SPEEDS

TECHNICAL FIELD

This invention relates in general to automated assembly on a conveyorized manufacturing line, and in particular to an apparatus for and method of indexing conveyor pallets at high speeds.

BACKGROUND ART

In some conveyorized manufacturing lines, the individual workpieces are mounted on a pallet and circulated along the conveyor to various processing location work stops to perform assembly on the workpieces. The amount of time required to complete an operation on a workpiece at one work stop is referred to as a cycle time. A cycle time includes not only the amount of time required to perform a specific operation, but also the time required to move the completed workpiece away from the work stop and increment or index the next workpiece into position. Even a small reduction in a cycle time can result in a significant increase in production capacity. Cycle time reductions are especially relevant in high speed manufacturing lines. Cycle time improvements can also reduce the size requirements of the operation, thereby decreasing capital investment expenditures.

There are many ways to reduce cycle times. One way is to incorporate "walking beams" into the manufacturing line to index palletized workpieces at high speeds. A typical walking beam is a cam-driven, elongated beam having a plurality of engagement members for engaging workpieces or pallets on a conveyor. The beam is designed to quickly index or process large numbers of workpieces simultaneously along the conveyor. Unfortunately, walking beams cause the manufacturing line to become synchronous, less flexible and much more expensive.

Another cycle time reducing option for conveyorized manufacturing lines is simply to increase the speed of the conveyor. The downside is that the pallets begin to impact each other and the work stops within the manufacturing line due to the high speeds. These impacts can cause physical and vibrational damage to the process and the workpieces on the pallets.

Yet another way to reduce cycle times is to incorporate a "pre-stop" at each work stop. A pre-stop is located on the conveyor immediately upstream of and adjacent to a work stop. Pre-stops bring the workpiece as close as possible to the work stop to reduce the cycle time and eliminate the need to synchronize the manufacturing line. The time required to move a workpiece pallet from a pre-stop to a work stop is limited by the coefficient of friction between the pallet and the conveyor to accelerate the pallet up to full speed. An improved apparatus and method for indexing pallets at high speeds is needed.

DISCLOSURE OF THE INVENTION

A pallet accelerator transfers workpiece pallets at high speeds from a pre-stop to a work stop in a conveyorized manufacturing line. While a workpiece is being processed in the work stop position, a pallet is released from a release stop into the pallet accelerator at the pre-stop position. The pallet accelerator has two fingers which engage the pallet. The pallet accelerator is pneumatically actuated to accelerate the pre-stop pallet forward while simultaneously pushing the work stop pallet downstream out of the work stop. The pallet accelerator resets for the next pallet released from the release stop while the pallet at the work stop is processed.

BEST MODE FOR CARRYING OUT THE INVENTION

Figure 1:
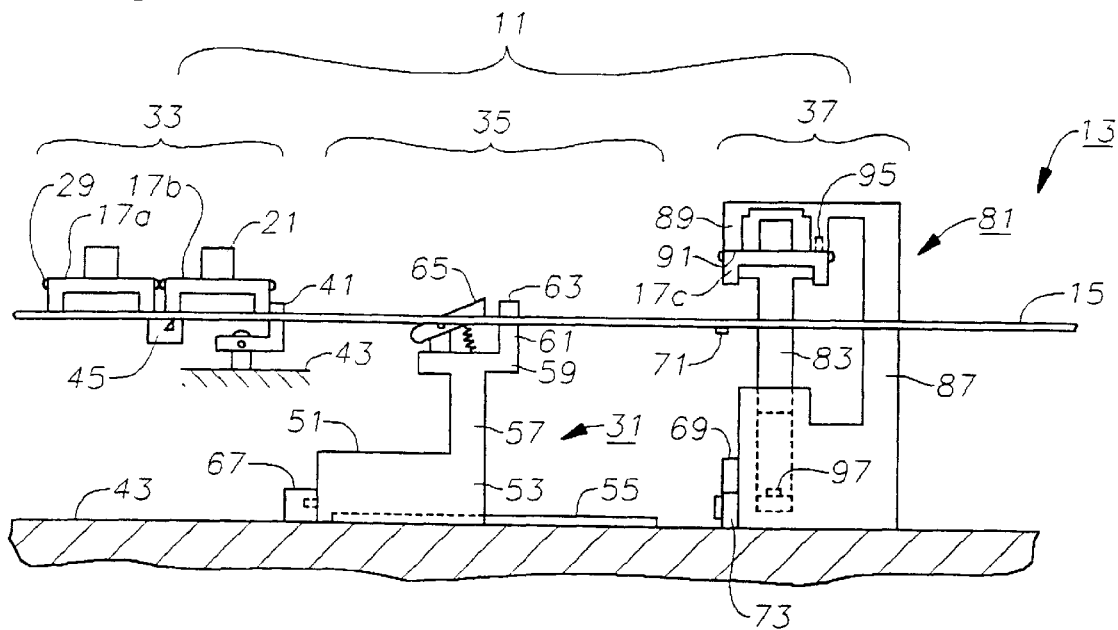
FIG. 1 is a schematic side view of a manufacturing line with a pallet accelerator at a first step of operation and is constructed in accordance with the invention.

Referring to FIG. 1, a single processing station 11 on a conveyorized manufacturing line 13 is shown. In FIG. 1 and the other figures, processing station 11 and manufacturing line 13 have been greatly simplified to facilitate understanding of the invention. Manufacturing line 13 has many processing stations 11, but only one is shown for simplification. In the preferred embodiment, one or more automated processing or assembly functions is performed at each processing station 11. However, some processing stations 11 may utilize manual labor to perform an operation.

Manufacturing line 13 utilizes a conveyor 15 such as a continuous belt to circulate a plurality of pallets 17 between and through processing stations 11. In the embodiment shown (FIG. 6), conveyor 15 comprises two parallel belts which are laterally spaced apart from one another at a fixed distance. Conveyor 15 continuously circulates from left to right at a constant velocity to move each pallet 17 from a first processing station to a final processing station (not shown). Each processing station manipulates an individual pallet 17 while performing their operations. In some instances, a pallet 17 may be temporarily removed from conveyor 15 while an operation is performed, and then placed back on the continuously moving conveyor 15.

Figure 6:
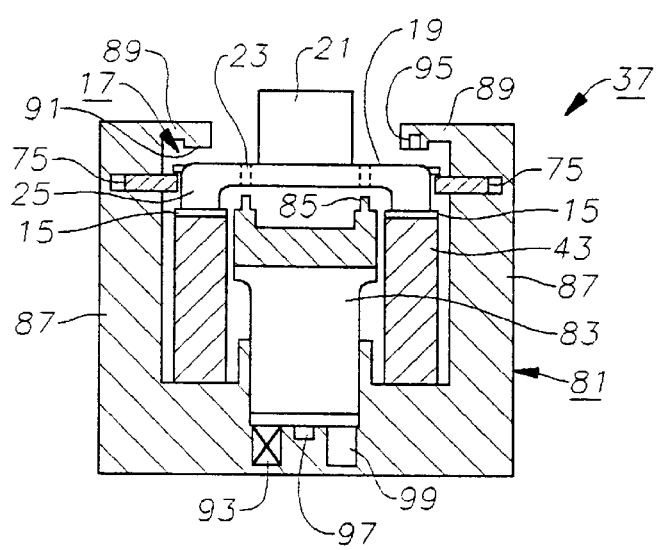
FIG. 6 is a sectional end view of a work stop portion of the manufacturing line of FIG. 1.
Figure 7:
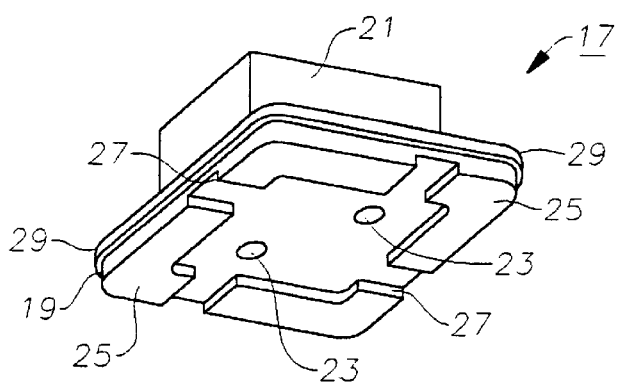
FIG. 7 is a lower isometric view of a pallet.

As shown in FIG. 7, each pallet 17 comprises a generally flat square platform 19 upon which a tool fixture 21 or work product is rigidly mounted. Platform 19 has a plurality of alignment holes 23 which are used to precisely position pallet 17 in processing station 11.

pallet17 also has four L-shaped, block-like pads or feet 25 extending from the lower surface of platform 19 around its perimeter. Feet 25 are spaced apart across a width of pallet 17 by about the same distance that the two belts of conveyor 15 are separated (FIG. 6). Thus, the space between the belts of conveyor 15 provides access to the lower surface of pallet 17. Each adjacent pair of feet 25 is separated by a square notch 27 such that one notch 27 is on each side of pallet 17. Notches 27 are offset from the midpoints of the sides of pallet 17 so that they do not align with one another across pallet 17. Each pallet 17 also has an elastomeric band or bumper 29 which extends completely around the vertical side walls of platform 19. Bumper 29 is provided to reduce shock to tool fixture 21 when pallet 17 contacts another object.

Processing station 11 utilizes an apparatus 31 and method for incrementing or indexing pallets 17 on conveyor 15. With apparatus 31, processing station 11 has three positions:

a release stop 33, a pre-stop 35 and a work stop 37. Release stop 33 is essentially a queuing point for collecting pallets 17 from a previous processing station. Release stop 33 is needed since the work performed at each processing station is not synchronized in time.

Release stop 33 has a catch pawl 41 which is pivotally mounted to a chassis or frame 43 for conveyor 15. Pawl 41 is biased to a catch position (FIG. 1) to prevent upstream pallets 17 from proceeding downstream with conveyor 15. A low coefficient of friction is provided between conveyor 15 and the lower surfaces of pallets 17 so that they easily slide on top of conveyor 15 when they are detained by pawl 41. When processing station 11 is ready for the next pallet 17, pawl 41 is actuated to a release position (FIG. 2) to allow one pallet 17 to continue downstream with conveyor 15 to pre-stop 35. Release stop 33 also has a sensor 45 for detecting the presence of a pallet 17.

Pre-stop 35 comprises the heart of the invention for apparatus 11. Pre-stop 35 utilizes a pallet accelerator 51 to engage a pallet 17 released from release stop 33 and rapidly move it to work stop 37. Pallet accelerator 51 has a base 53 which is mounted to frame 43 of conveyor 15. In the preferred embodiment, base 53 is actuated a short distance between upstream and downstream positions (left and right, respectively) with a pneumatic slide 55.

An arm 57 extends vertically upward from base 53 and terminates in a platform 59. A stop finger 61 is rigidly mounted to one end of platform 59. Stop finger 61 has a vertical portion 63 located in the gap between the belts of conveyor 15. Vertical portion 63 extends above an upper surface of conveyor 15. Platform 59 also has a pivot finger 65 which is pivotally mounted to it slightly upstream from stop finger 61. Pivot finger 65 is spring-biased to an upper position away from platform 59. Fingers 61, 65 have a width which is slightly narrower than a width of notches 27 on pallets 17.

Pre-stop 35 has several other devices for ensuring the smooth delivery of pallets 17. A pair of sensors 67, 69 are mounted to frame 43 for detecting the presence of base 53 when it moves to its upstream and downstream positions, respectively. Pre-stop 35 also has a sensor 71 mounted to frame 43 for detecting the presence of the pre-stop pallet 17 when it arrives at work stop 37. In one embodiment, sensors 67, 69, 71 are proximity sensors. Finally, a hydraulic shock absorber or damper 73 is mounted to frame 43 adjacent to work stop 37 for decelerating base 53 and pallet accelerator 51 to a stop at the downstream position.

The last stage of processing station 11 is work stop 37. As shown in FIG. 6, frame 43 of conveyor 15 extends through work stop 37. After sensor 71 detects that pallet accelerator 51 has located the pre-stop pallet 17 in work stop 37, pallet 17 is centered across the width of work stop 37 by precision located guide rails 75 located on the lateral sides of conveyor 15 and pallet 17. In the embodiment shown, guide rails 75 are fixed, but are have a precise clearance of only 0.006 inches each side of pallet 17. Pallet 17 is simultaneously lifted vertically off of conveyor 15 by a lift and position (LAP) mechanism 81. Mechanism 81 has a pneumatically actuated piston 83 located below conveyor 15 and between the sides of frame 43 for lifting pallet 17. Piston 83 has two pins 85 with precise locations and diameters which engage holes 23 in pallet 17. Pins 85 ensure the proper horizontal lateral and transverse position of pallet 17 during the lift operation.

Figure 5:
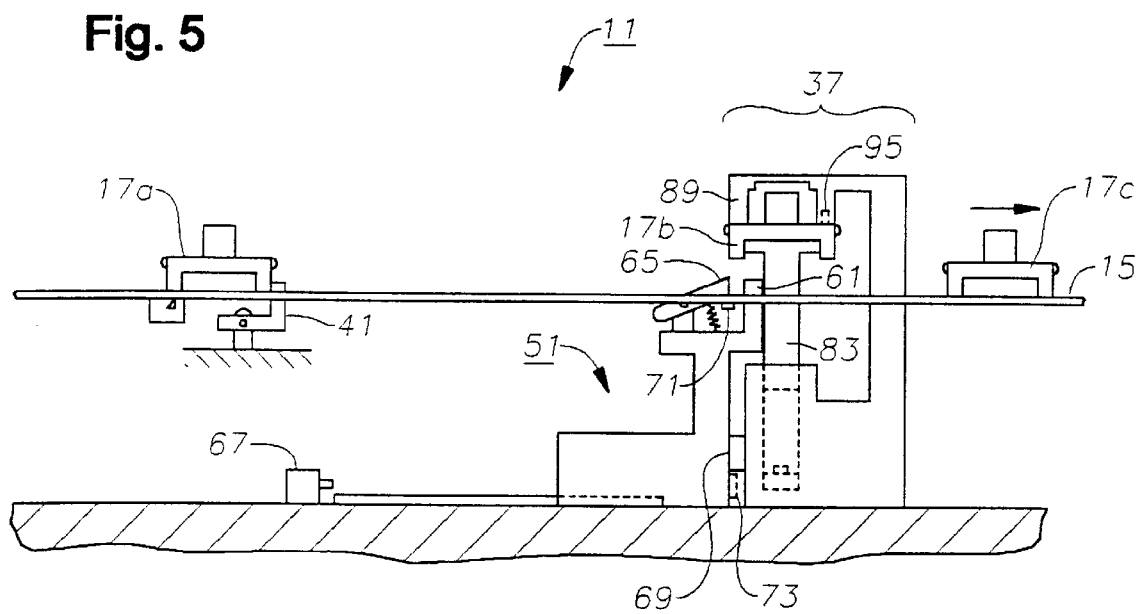
FIG. 5 is a schematic side view of the manufacturing line of FIG. 1 at a fifth step of operation.

Mechanism 81 has two vertical arms 87 each of which terminates in a finger 89. Each finger 89 has a vertical stop 91 for limiting the upward vertical movement of pallet 17. Stops 91 engage the upper surface of platform 19 when piston 83 is at the top of its stroke. As shown in FIG. 5, piston 83 elevates pallet 17 high enough to be free of fingers 61, 65 of pallet accelerator 51 (approximately 6 mm). When piston 83 reaches the top of its stroke, the pneumatic pressure used to elevate it is also used to hold it in place during processing. In the event that air pressure to piston 83 is lost, a spring 93 is used to maintain the position and control of pallet 17. In the preferred embodiment, each stop 33, 35 has this back-up spring feature so that the pallets 17 do not move uncontrolled on conveyor 15. At release stop 33, pawl 41 has a spring (not shown) to maintain control of its pallets 17. After processing at work stop 37 is complete, piston 83 is forced down to its original position with pneumatic pressure.

Work stop 37 has a sensor 95 for detecting when pallet 17 contacts fingers 89. Work stop 37 also has a sensor 97 for detecting when piston 83 is at its lower position. In one embodiment, sensors 95, 97 are proximity sensors. A hydraulic shock absorber or damper 99 (shown schematically in FIG. 6) is mounted to mechanism 81 for decelerating piston 83 and pallet 17 at the upper position.

Figure 2:
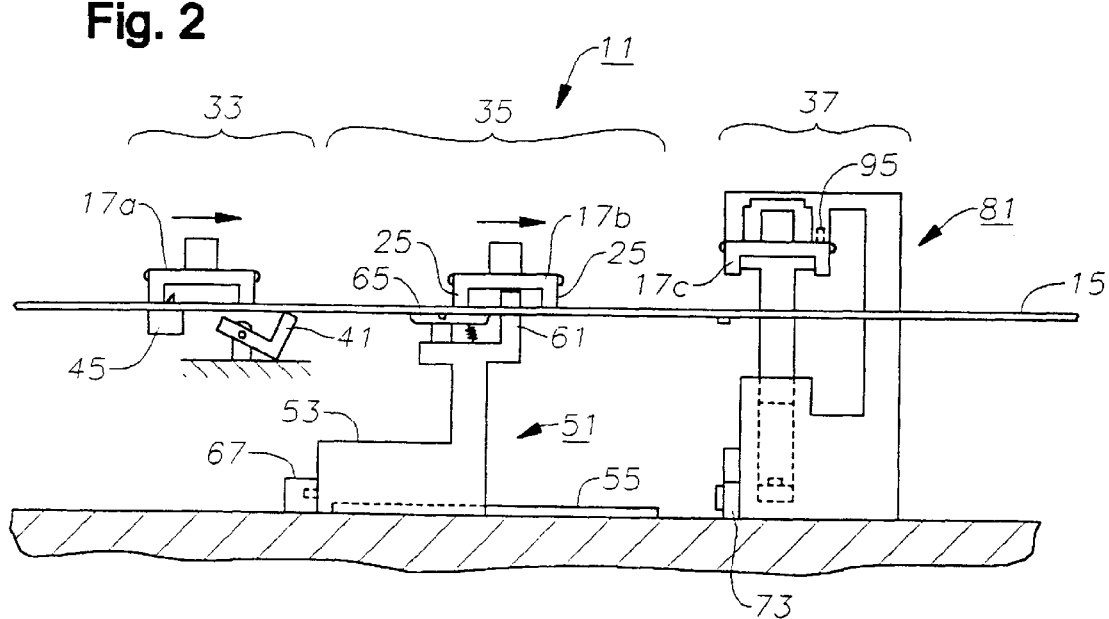
FIG. 2 is a schematic side view of the manufacturing line of FIG. 1 at a second step of operation.
Figure 3:
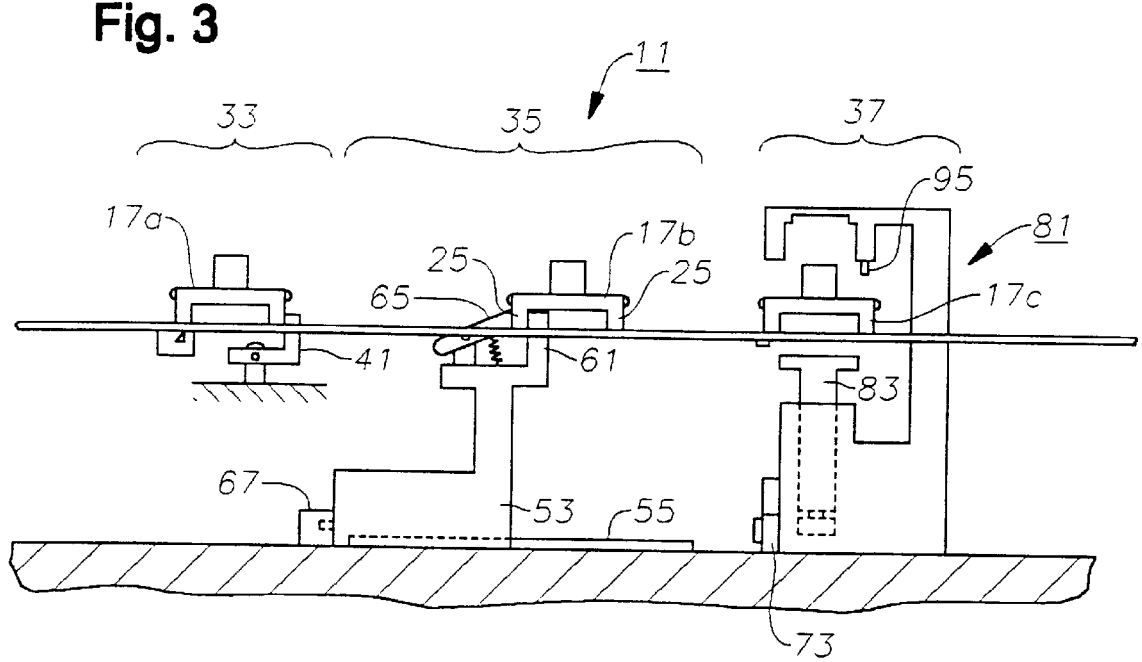
FIG. 3 is a schematic side view of the manufacturing line of FIG. 1 at a third step of operation.

In operation (FIG. 1), pallets 17a, 17b arrive at release stop 33 where they are temporarily detained by pawl 41. Pallet accelerator is located in its downstream starting position, and a pallet 17c is being processed at work stop 37. When the presence of pallet 17b is detected at sensor 45, and base 51 trips sensor 67, pawl 41 releases pallet 17b (FIG. 2) and then re-closes (FIG. 3). Since conveyor 15 is continuously circulating, pallet 17b moves into pre-stop 35 over pallet accelerator 51 (FIG. 2) while pallet 17a moves forward to abut pawl 41. Note that as pallet 17b moves downstream, fingers 61, 65 pass through the notch 27 on its downstream side. This clearance allows finger 61 to remain fixed and stationary without interrupting the movement of pallet 17b on conveyor 15. Since the notch on the upstream side of pallet 17b is not aligned with the downstream side notch 27, finger 65 is pivoted downward by upstream foot 25 (FIG. 2). As shown in FIG. 3, stop finger 61 catches on upstream foot 25 to prevent further movement of pallet 17b. As soon as upstream foot 25 passes finger 65, finger 65 pops back up to its original position to grip pallet 17b. The separation between fingers 61 and 65 is approximately equal to the thickness of foot 25.

Figure 4:
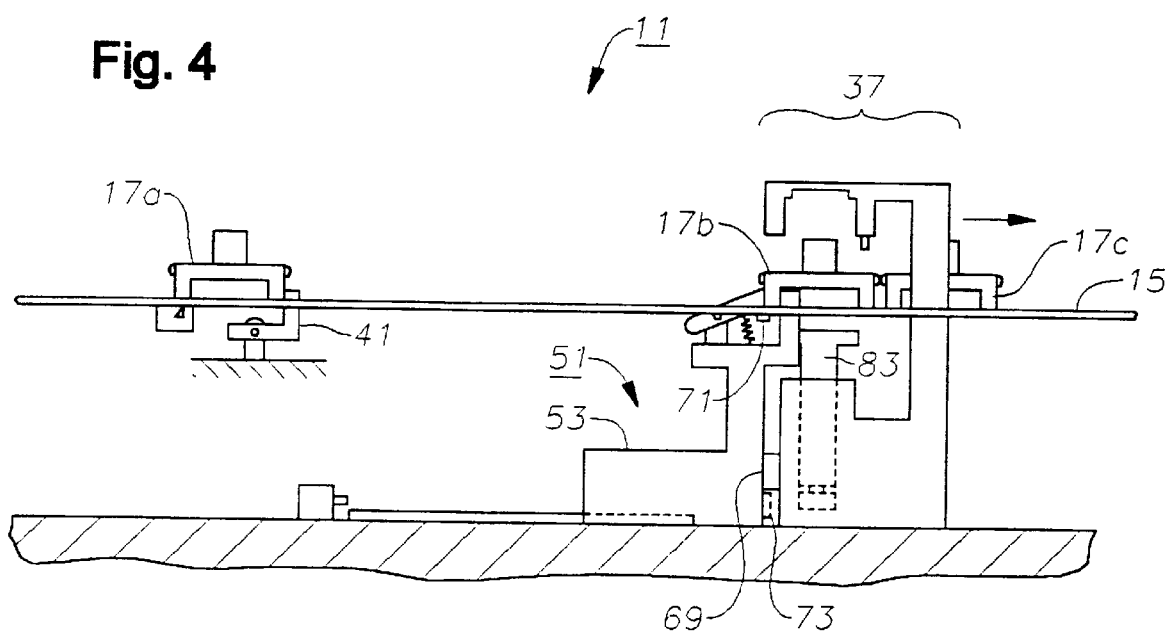
FIG. 4 is a schematic side view of the manufacturing line of FIG. 1 at a fourth step of operation.

Just after pallet accelerator 51 grips pallet 17b, work stop 37 finishes processing pallet 17c and lowers it back onto conveyor 15 (FIG. 3). As piston 83 clears pallet 17c and sensor 97 has detected the lower position of piston 83, pneumatic slide 55 catapults pallet accelerator 51 forward at a rate which is several times faster than the speed of conveyor 15 (FIG. 4). Pallet 17b quickly catches up to and pushes pallet 17c further downstream on conveyor 15. Since pallet 17b is gripped by fingers 61, 65, pallet accelerator 51 maintains control of pallet 17b during this time. Pallet accelerator 51 is quickly decelerated by damper 73 and its presence at work stop 37 is detected by sensor 69. The presence of pallet 17b at work stop 37 is detected by sensor 71.

Referring now to FIG. 5, pallet 17b is lifted from the grip of pallet accelerator 51 by piston 83 until pallet 17b completely clears fingers 61, 65. When pallet 17b is elevated to fingers 89 of mechanism 81, sensor 95 detects its presence and beings processing pallet 17b. Tripping sensor 95 also returns pallet accelerator 51 to its starting position (FIG. 1). After base 53 trips sensor 67, pallet 17a will be released to pre-stop 35 and the process continues.

The invention has many significant advantages. The pallet accelerator provides a low cost solution for high speed indexing with controlled deceleration, overall cycle time reductions, asynchronous processing, implementation flexibility to many types of conveyors, and precision location of pallets in three dimensions. Since the time required to reset the pallet accelerator elapses while a pallet is processed at the work stop, the cycle time is not affected. For pallets which are approximately three inches square, the pallet accelerator consumes less than 0.2 seconds to move a pallet to the work stop. This is significantly faster than merely conveying a pallet from a pre-stop to the work stop. The pallet can be located within 0.001 inches at the workstop.

While the invention has been shown or described in only some of its forms, it should be apparent to those skilled in the art that it is not so limited, but is susceptible to various changes without departing from the scope of the invention.

I claim:

1. A method for moving a workpiece to a work station of an assembly line, comprising:
   (a) placing a first workpiece on a conveyor and moving the conveyor at a substantially constant velocity to advance the first workpiece toward a work station;
   (b) detaining the first workpiece at a selected distance from the work station while the conveyor continues to advance toward the work station; then
   (c) engaging the first workpiece with a workpiece accelerator; and
   (d) moving the workpiece accelerator with the first workpiece to the work station at a velocity which exceeds the velocity of the conveyor.

2. The method of claim 1, further comprising the step of resetting the workpiece accelerator to repeat steps (c) and (d) with subsequent workpieces.

3. The method of claim 1 wherein step (b) further comprises queuing and simultaneously detaining a plurality of workpieces.

4. The method of claim 1 wherein step (b) comprises selectively engaging the first workpiece with a movable finger.

5. The method of claim 1 wherein step (c) comprises engaging the first workpiece between a stop finger and a pivot finger on the workpiece accelerator.

6. The method of claim 1 wherein step (c) occurs while processing a previous workpiece at the work station.

7. The method of claim 6 wherein step (d) occurs upon completion of the processing of the previous workpiece.

8. The method of claim 6 wherein the workpiece accelerator pushes the previous workpiece downstream on the conveyor with the first workpiece during step (d).

9. The method of claim 1 wherein step (d) comprises pneumatically actuating the workpiece accelerator.

10. The method of claim 1 wherein step (d) further comprises decelerating the workpiece accelerator at the work station with a hydraulic damper.

11. A method of performing work on workpieces in an assembly line, comprising:
   (a) providing a conveyor having a release stop, a pre-stop and a work stop spaced along the conveyor;
   (b) advancing the conveyor continuously at a substantially constant velocity in a direction from the release stop toward the work stop;
   (c) processing a first workpiece at the work stop while the conveyor continues to advance;
   (d) detaining a plurality of workpieces being advanced on the conveyor at the release stop while the conveyor continues to advance toward the work stop; then
   (e) releasing a second workpiece from the plurality of workpieces at the release stop to advance with the conveyor toward the pre-stop while the first workpiece is being processed at the work stop; then
   (f) engaging the second workpiece with a workpiece accelerator at the pre-stop while the conveyor continues to advance toward the work stop;
   (g) after the processing of the first workpiece at the work stop has been completed, propelling the workpiece accelerator with the second workpiece from the pre-stop to the work stop at a velocity which exceeds the velocity of the conveyor; then
   (h) removing the second workpiece from the workpiece accelerator to process the second workpiece at the work stop; and then
   (i) returning the workpiece accelerator to the pre-stop to repeat steps (e) through (h) with subsequent workpieces detained at the pre-stop.

12. The method of claim 11 wherein step (d) comprises selectively engaging the second workpiece with a finger.

13. The method of claim 11 wherein step (f) comprises engaging the second workpiece between a stop finger and a pivot finger on the workpiece accelerator.

14. The method of claim 11, further comprising the step of lifting the first workpiece off of the conveyor prior to step (c).

15. The method of claim 11 wherein the workpiece accelerator pushes the previous workpiece downstream on the conveyor with the first workpiece during step (g).

16. The method of claim 11 wherein step (g) comprises pneumatically actuating the workpiece accelerator.

17. The method of claim 11 wherein step (g) further comprises decelerating the workpiece accelerator with a hydraulic damper.

18. An apparatus for moving a workpiece on a conveyor to a work station, comprising:
   a release stop adapted to be mounted adjacent to the conveyor for selectively detaining workpieces on the conveyor;
   a workpiece accelerator having an engagement member which is adapted to be located adjacent to the conveyor between the release stop and a work station for engaging a workpiece released from the release stop, the workpiece accelerator having a propulsion device which moves the workpiece to the work station at a velocity which exceeds a velocity of the conveyor; and wherein
   the engagement member of the workpiece accelerator comprises a stationary finger for intercepting a first portion of the workpiece on the conveyor and a movable finger for gripping a second portion of the workpiece located opposite the first portion.

19. The apparatus of claim 18 wherein the movable finger is pivotally mounted to and spring-biased away from the stationary finger.

20. An apparatus for moving a workpiece on a conveyor to a work station, wherein the conveyor moves in one direction, the apparatus comprising:
   a release stop adapted to be mounted adjacent to the conveyor for selectively detaining workpieces on the conveyor;
   a workpiece accelerator having an engagement member which is adapted to be located adjacent to the conveyor between the release stop and a work station for engaging a workpiece released from the release stop, the workpiece accelerator having a propulsion device which moves the workpiece in the same direction as the conveyor to the work station at a velocity which exceeds a velocity of the conveyor.

21. The apparatus of claim 20 wherein the release stop comprises a pivotable finger.

22. The apparatus of claim 20 wherein the propulsion device comprises a pneumatic actuator.

23. The apparatus of claim 20, further comprising a hydraulic damper for decelerating the workpiece accelerator at the work station.

24. The apparatus of claim 20, further comprising sensors which are adapted to detect the presence of the workpiece accelerator along the conveyor.

25. The apparatus of claim 20, further comprising sensors which are adapted to detect the presence of the workpiece at the release stop and at the work station.

26. An assembly line for processing workpieces, comprising:
    a conveyor for moving workpieces;
    a release stop mounted adjacent to the conveyor for detaining workpieces on the conveyor while the conveyor continues to advance;
    a work station mounted adjacent to the conveyor for processing workpieces;
    a workpiece accelerator having an engagement member which is located adjacent to the conveyor between the release stop and the work station for engaging a workpiece released from the release stop, the workpiece accelerator having a propulsion device which moves the workpiece to the work station at a velocity which exceeds a velocity of the conveyor; and wherein
    the engagement member of the workpiece accelerator comprises a stationary finger for intercepting a first portion of the workpiece on the conveyor and a movable finger for gripping a second portion of the workpiece located opposite the first portion.

27. The assembly line of claim 26 wherein the movable finger is pivotally mounted to and spring-biased away from the stationary finger.

28. An assembly line for processing workpieces, comprising:
    a conveyor for moving workpieces in one direction;
    a release stop mounted adjacent to the conveyor for detaining workpieces on the conveyor while the conveyor continues to advance;
    a work station mounted adjacent to the conveyor for processing workpieces; and
    a workpiece accelerator having an engagement member which is located adjacent to the conveyor between the release stop and the work station for engaging a workpiece released from the release stop, the workpiece accelerator having a propulsion device which moves the workpiece in the same direction as the conveyor to the work station at a velocity which exceeds a velocity of the conveyor.

29. The assembly line of claim 28 wherein the release stop comprises a pivotable finger.

30. The assembly line of claim 28 wherein the propulsion device comprises a pneumatic actuator.

31. The assembly line of claim 28, further comprising a hydraulic damper for decelerating the workpiece accelerator at the work station.

32. The assembly line of claim 28, further comprising sensors for detecting the presence of the workpiece accelerator along the conveyor.

33. The assembly line of claim 28, further comprising sensors for detecting the presence of workpieces at the release stop and at the work station.

34. The assembly line of claim 28, further comprising a lifting device at the work station for removing the workpiece from the workpiece accelerator.

* * * * *